United States Patent [19]

Johnson et al.

[11] Patent Number: 4,580,270
[45] Date of Patent: Apr. 1, 1986

[54] HIGH-ENERGY LASER SYSTEM HAVING GYROSCOPICALLY STABILIZED OPTICAL ELEMENTS

[75] Inventors: William M. Johnson, Sudbury; Marc S. Weinberg, Needham; Raymond Carroll, Andover, all of Mass.

[73] Assignee: The Charles Stark Draper Laboratory, Inc., Cambridge, Mass.

[21] Appl. No.: 512,172

[22] Filed: Jul. 8, 1983

[51] Int. Cl.$^4$ ............................................. H01S 3/08
[52] U.S. Cl. ..................................... 372/107; 372/34; 372/95; 372/99; 350/500
[58] Field of Search ..................... 372/95, 98, 94, 99, 372/104, 34, 107; 356/5, 152; 350/500

[56] References Cited

U.S. PATENT DOCUMENTS 4,146,329 3/1979 King et al. ........................... 372/107
4,326,800 4/1982 Fitts ..................................... 356/152

Primary Examiner—William L. Sikes
Assistant Examiner—Léon Scott, Jr.
Attorney, Agent, or Firm—Weingarten, Schurgin, Gagnebin & Hayes

[57] ABSTRACT

A high-energy laser system having gyroscopically stabilized optical elements includes an unstable confocal laser resonator having first and second spinning cavity feedback mirrors that resist mechanical wave energy induced spatial dislocations by gyroscopic inertia. One or both of the spinning cavity mirrors are preferably mounted for rotation with the rotor of a gyroscope. The gyroscope is operative as an actuator for selectively tilting the spinning mirror, and as a direction indicator for controlling the pointing direction of other elements with respect to inertial space. The angular rotation of the cavity feedback mirrors generates aerodynamic flows that cool the spinning mirrors by convective heat transport. Every material particle thereof describes an annular path once per revolution that prevents hot-spot formation and extends the useful lifetime.

24 Claims, 4 Drawing Figures

HIGH-ENERGY LASER SYSTEM HAVING GYROSCOPICALLY STABILIZED OPTICAL ELEMENTS

CROSS REFERENCE TO RELATED APPLICATIONS

This application is related to two applications each entitled, "Common Optical Aperture Laser Boresighter for Reciprocal Path Optical Systems", respectively by William M. Johnson, and William M. Johnson and Kenneth Smith, both filed on even date herewith, and assigned to the same assignee as the instant invention.

FIELD OF THE INVENTION

This invention is directed to the field of optics, and more particularly, to a novel high-energy laser system having gyroscopically stabilized optical elements.

BACKGROUND OF THE INVENTION

Cavity mirrors, relay mirrors, and other optical elements of high-energy laser systems are commonly hard-mounted to suitable support structures provided therefor. In many applications, mechanical wave energy such as from support base motion couples through such hard mounting structures and induces spacial dislocations of the optical elements including vibration, jitter, and other dynamic effects that adversely affect, among other things, outgoing beam alignment. It is known to provide resilient optical element mounting structures for vibrationally isolating the optical elements from mechanical wave energy. However, such resilient mounting structures often present considerable interface difficulties, and moreover fail to provide the critical alignment called for in many high-precision high-energy laser applications. It is also known to provide a closed-loop controller having an attitude sensor and an actuator for correcting spatial dislocations induced by mechanical wave energy as exemplified by O'Hara et al., U.S. Pat. No. 4,062,126, incorporated herein by reference. The utility of such systems is limited, among other things, due to the comparatively costly and complex electronic controller circuitry required, due to the necessity of providing separate attitude sensors for sensing dislocations along the azimuthal and elevational planes, and due to the requirement of reserving mounting surfaces on the optical elements not only for the attitude sensors but for the actuators as well.

SUMMARY OF THE INVENTION

The present invention overcomes these and other disadvantages, and provides mechanical wave energy vibrational decoupling for the cavity mirrors and other optical elements of a high-energy laser system by gyroscopic inertia. In preferred embodiment, the high-energy laser system having gyroscopically stabilized optical elements of the present invention includes a confocal unstable high-energy laser resonator having first and second spaced-apart cavity feedback mirrors, and means coupled to one or both of the cavity mirrors for angularly rotating the mirrors such that the spin vector of the mirrors is coincident with the gyroscopic axis of stability. The gyroscopic inertia of the angularly rotating cavity feedback mirrors thereby tends to maintain the direction of its spin vector with respect to inertial space unaltered when it is subjected to unbalanced mechanical wave energy induced angular torque impulses. Means are provided for sensing the inclination of the spin vector of the optical elements with respect to other elements so that they too can be stabilized with respect to inertial space. Means are provided for controlling the spin vector direction with respect to inertial space so that the mirror can be pointed by externally generated command and so that gyroscopic precession induced by fixed torques or rotor to base motion can be compensated. The angularly rotating cavity feedback mirrors create aerodynamic flows which cool the high-energy cavity feedback mirrors by forced convective heat transport. In addition, every material particle of the angularly rotating high-energy cavity feedback mirrors sweeps through an annular path every revolution whch prevents hot-spot formation and extends the useful operating life.

BRIEF DESCRIPTION OF THE DRAWINGS

Other advantages and features of the instant invention will become apparent as the invention becomes better understood by referring to the following exemplary and non-limiting detailed description of the preferred embodiments, and to the drawings, wherein.

DETAILED DESCRIPTION OF THE PREFERRED EMBODIMENT

Figure 1:
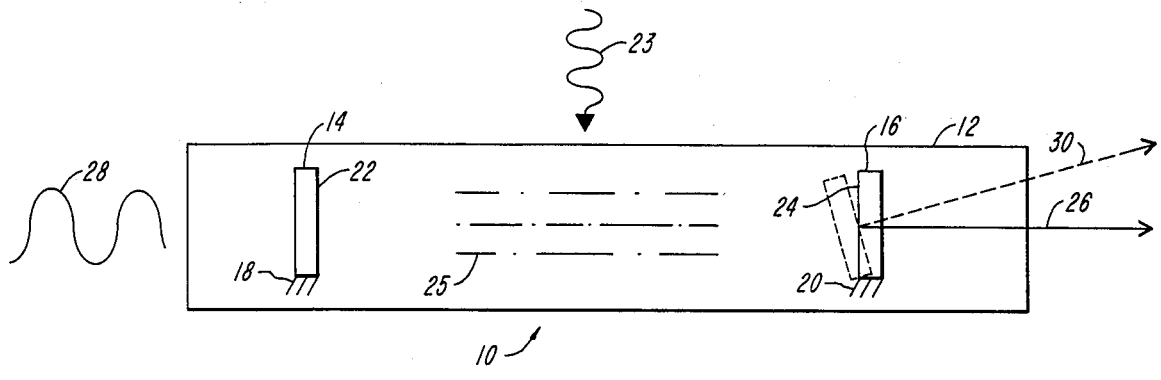
FIG. 1 is a block diagram illustrating a typical prior art laser having hard-mounted cavity feedback mirrors.

Referring now to FIG. 1, generally designated at 10 is the schematic diagram illustrating a typical prior art laser. The laser 10 includes an optically resonant cavity 12 having two spaced-apart cavity mirrors 14 and 16 that are rigidly fastened to suitable supports 18 and 20 respectively provided therefor. Typically, the mirror 12 has a totally reflecting surface 22, and the mirror 14 has a partially reflecting surface 23. Energy 24 such as from a flash lamp or an electrical discharge effects a population inversion in a suitable lasing medium 25, and produces coherent light in well known manner that passes through the partially reflecting surface 24 of the mirror 14 along an optical path 26 to a targeted object, not shown. Mechanical wave energy 28 incident on the laser 10 as discussed in the background of the invention effects undesirable spatial dislocations of the mirrors 14, 16 that often results, among other things, in outgoing beam misalignment as schematically illustrated in dashed line 30.

Figure 2:
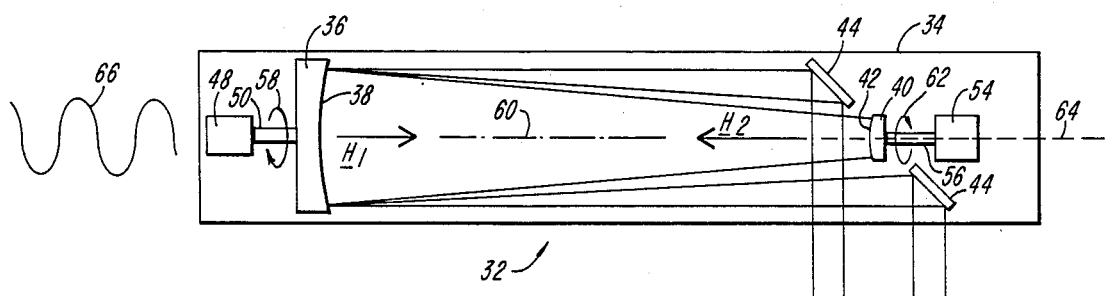
FIG. 2 is a block diagram illustrating a confocal unstable laser resonator having gyroscopically stabilized cavity feedback mirrors according to the present invention.

Referring now to FIG. 2, generally designated at 32 is a novel high-energy laser system having gyroscopically stabilized optical elements according to the present invention. The system 32 preferably includes a confocal, unstable laser resonator cavity 34 having a first cavity mirror 36 having a concave spherical reflecting surface 38, and a spaced-apart second cavity mirror 40 having a convex spherical reflecting surface 42. A 45° scraper mirror 44 is positioned adjacent the cavity mirror 40 in the usual manner. Laser light produced by the confocal unstable resonator cavity 34 walks-off the cavity mirror 40 and onto the 45° scraper mirror 44, and is deviated thereby on-target and in-focus through relay optics 46 onto a targeted object, not shown.

The cavity mirror 36 is preferably connected to a motor 48 over a shaft 50 that is journaled on bearings, not illustrated. The cavity mirror 40 is also connected to a motor 54 on a shaft 56 that is journaled on bearings, also not illustrated. The motor 48 angularly rotates the mirror 36 in a clockwise direction as indicated by an arrow 58, and produces a spin vector designated $H_1$ that is colinear with its axis of rotation 60. The motor 54 angularly rotates the mirror 40 in a counterclockwise direction as illustrated by an arrow 62, and produces a spin vector designated $H_2$ that is colinear with its axis of rotation 64. It is noted that the direction of rotation can be changed without departing from the inventive concept.

Each of the rotating members 36, 40 defines a gyroscopic axis of stability that is coincident with the respective spin vectors $H_1$, $H_2$ and with the respective spin axes 60, 64. Mechanical wave energy 66 incident on the laser cavity 34 produces an unbalanced angular impulse that acts on the angularly rotating cavity feedback mirrors 36, 40. The gyroscopic inertia of the angularly rotating cavity feedback mirrors 36, 40 resists the unbalanced angular impulses and tends to maintain the direction of the spin vectors coincident with the gyroscopic axes of stability, and unaltered with respect to inertial space, thereby providing a measure of vibrational isolation from undesirable mechanical wave energy induced spatial dislocations. A relay mirror 68 of the relay optics 46 can likewise be gyroscopically stabilized by a motor 70 that angularly rotates the relay mirror 68 as illustrated by counterclockwise arrow 72. It will be appreciated that other optical elements can be gyroscopically stabilized other than the cavity feedback mirrors 36, 40 and the mirror 68 of the relay optics 46 without departing from the inventive concept.

Figure 3:
FIG. 3 is a pictorial view of one of the cavity feedback mirrors and illustrates the way in which hot spot formation is substantially eliminated.

The angularly rotating cavity mirrors 36, 40 each induce three-dimensional aerodynamic flows around the elements which cool the mirrors by convective heat transport. As shown in FIG. 3, the angular rotation of the spinning mirrors causes each material particle thereof schematically illustrated at 74 to sweep an annular path 76 once every revolution. Hot spots are spatially distributed along the annular path 76, which results in a significant improvement in the useful lifetime of the high-energy cavity feedback mirrors.

As will be appreciated by those skilled in the art, the unbalanced angular impulses effect a precession of the angularly rotating optical elements to a degree that depends on the magnitude of the moment of inertia of the angularly rotating optical elements, and on the magnitude of the unbalanced angular torque impulses imparted thereto by the mechanical wave energy. While any suitable means may be employed to correct for precession, it is particularly advantageous to mount the optical elements for rotation with the rotor of a gyroscope. As appears more fully below, in this manner not only can precession be made small, but the gyroscope can be operated as an actuator for providing optical element tilt control as well as a direction sensor to control the orientation of the scraper mirror, among other stabilization and other functions.

Figure 4:
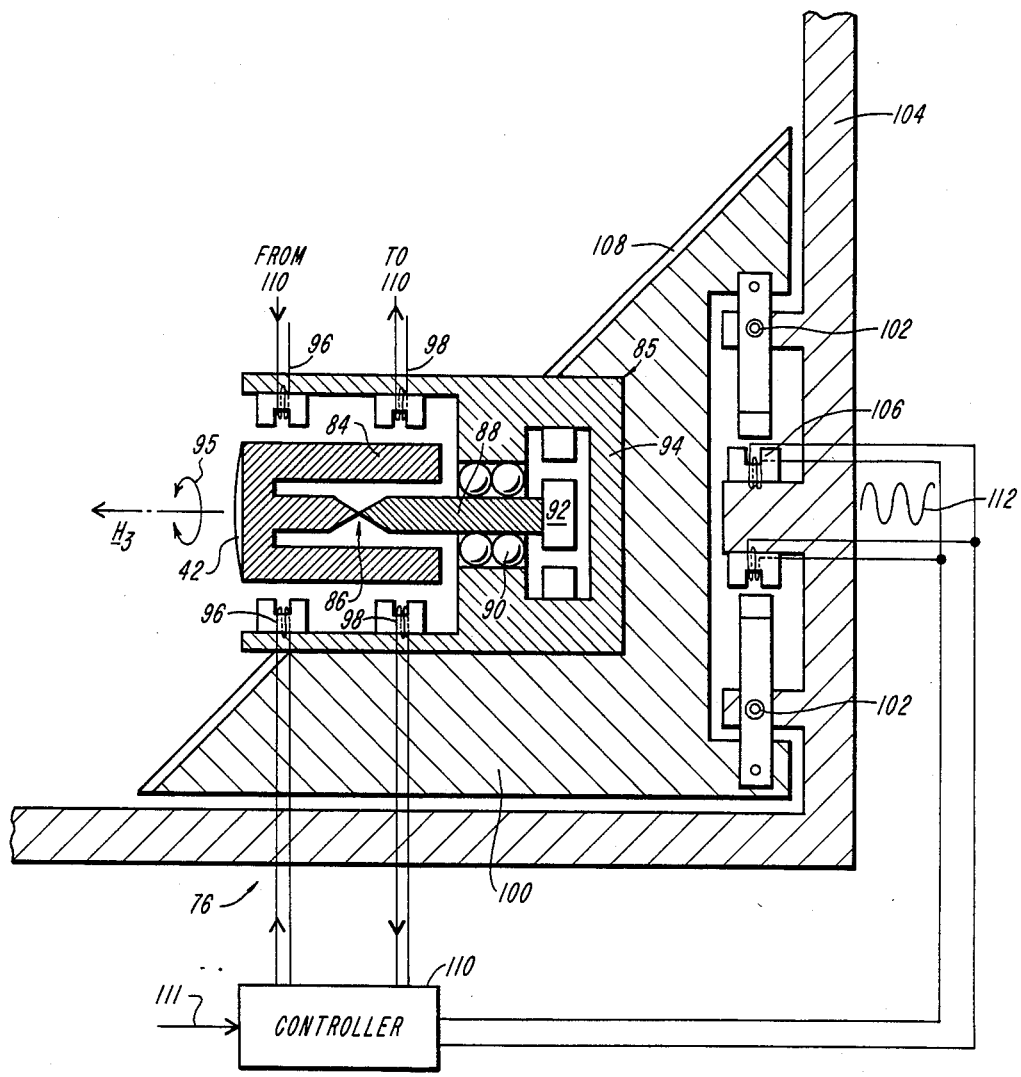
FIG. 4 is a detailed schematic diagram illustrating a preferred mounting arrangement for one of the gyroscopically stabilized cavity feedback mirrors of the confocal unstable laser resonator of FIG. 2.

Referring now to FIG. 4, generally designated at 76 is a detailed schematic diagram illustrating a preferred mounting arrangement for the cavity feedback mirror 42 of the confocal unstable resonator cavity of FIG. 2. The mirror 42 is preferably mounted to a rotor 84 of a gyroscope generally designated 85, with the normal to the mirrored surface 82 of the mirror 80 coincident with the axis of revolution of the rotor 84. The rotor 84 is coupled by a flexible hinge generally designated 86 to a shaft 88 journaled on bearings 90 and driven by a motor generally designated 92 that is fixably attached to a stator housing 94. The motor 92 angularly rotates the mirror 80 in a counterclockwise direction as illustrated by the arrow 95, producing a spin vector designated $H_3$. Preferably, the mirror 42 is rigidly fastened to the end of the rotor 84. Any suitable flexible hinge 86 such as a tuned Hooke's joint providing two degrees of rotational freedom can be employed.

The gyroscope 85 includes a first pair of actuator coils 96 mounted to the stator 94 in spaced-apart relation to the rotor 84, a second pair of actuator coils similarly mounted in a plane orthogonal to the plane of the drawing, not illustrated, a first pair of transducer coils 98 mounted to the stator 94 in spaced-apart relation to the rotor 84, and a second pair of transducer coils similarly mounted in the plane orthogonal to the plane of the drawing, not illustrated. The stator 94 is fastened in a support 100 pivotally mounted at 102 to a frame 104. Actuator coils 106 are operative to selectively rotate the support 100 about the pivot 102. The actuator coils 106 may also be advantageously employed to null the gyroscopic control system if desired. The rotor 84 can be centered with respect to the stator 94 even when external disturbances are sensed by gyroscopic precession. A 45° scraper mirror 108 is fastened to the support 100 and around the cavity mirror 42. A controller 110 is connected to the transducer coils 98, to the actuator coils 96, and to the coils 106. Mechanical wave energy 112 is incident on the platform 104.

In operation, the angularly rotating mirror 42 is vibrationally isolated from unbalanced mechanical wave energy induced angular impulses by gyroscopic inertia as described above in connection with FIG. 2. It is noted that vibration isolation of the mirror 42 is also obtained by the tuned flexible hinge 86, where the hinge stiffness, inertia, and rotor spin speed are selected in a well known manner such that the effective spring restoring force is substantially equal to zero. Any precession torques on the angularly rotating mirror and rotor assembly fixed or induced by housing 94 to rotor 84 motion can be compensated from position signals produced by the transducer coils 98. The controller 110 is operative in response to the transducer signals and external position commands 111 to provide the appropriate control signals to the actuating coils 96 that electromagnetically couple to the rotor 84 producing actuating torques, in addition to precession compensation torques, to maintain or effect an intended orientation for the mirror 42. It will be appreciated that the coils 96, 98 can be operated as an actuator to controllably orient the mirror 42 during alignment and for other purposes, and can be operated as a direction sensor for controlling via the coils 106 the pointing direction of the scraper mirror 108 and that controlling and sensing can be simultaneously performed since only known torques are applied to the rotor.

Many variations of the presently disclosed invention will be apparent to those skilled in the art without departing from the scope of the appended claims.

What is claimed is:

1. A vibrationally isolated optical system vibrationally isolated against externally arising and unbalanced mechanical wave energy, comprising:
   a laser resonator having an active medium and having a first cavity feedback mirror defining a pointing direction subject to spatial dislocation induced by said externally arising and unbalanced mechanical wave energy;
   means for lazing the active medium, and
   means coupled to said first cavity feedback mirror for angularly rotating said first cavity feedback mirror about an axis of rotation defining a gyroscopic axis of a stability and having a spin vector that are both colinear with said pointing direction such that said spatial dislocation of said pointing direction is neutralized and resisted by action of gyroscopic inertia that tends to maintain said pointing direction and spin vector coincident with said gyroscopic axis of stability and unaltered with respect to inertial space notwithstanding said externally arising and unbalanced mechanical wave energy.

2. The invention of claim 1, wherein said laser resonator is a confocal unstable laser resonator.

3. The invention of claim 2, wherein said angular rotation providing means includes a motor coupled to said first cavity feedback mirror.

4. The invention of claim 3, further including a rotor, wherein said rotor is coupled to said motor, and wherein said first cavity feedback mirror is fastened to said rotor for rotation therewith, with the normal to its reflective surface colinear with the axis of revolution of said rotor.

5. The invention of claim 4, further including a flexible hinge coupled between said rotor and said motor, said flexible hinge having two degrees of rotational freedom.

6. The invention of claim 5, wherein said flexible hinge includes a tuned Hooke's joint.

7. The invention of claim 4, further including means coupled to said rotor for sensing the direction of said spin vector with respect to inertial space.

8. The invention of claim 7, wherein said direction sensing means includes transducer coils mounted to a stator housing.

9. The invention of claim 4, further including means coupled to said rotor for controlling the orientation of said spin vector with respect to inertial space.

10. The invention of claim 9, wherein said orientation controlling means includes actuator coils mounted to a stator housing.

11. The invention of claim 1, said laser resonator includes a second cavity feedback mirror, and further including means coupled to said second cavity feedback mirror for angularly rotating said second cavity feedback mirror producing a spin vector colinear with a gyroscopic axis of stability that resists any unbalanced mechanical wave energy induced angular impulses and maintains the direction of spin vector coincident with the gyroscopic axis of stability and unaltered with respect to inertial space.

12. In a method for vibrationally isolating the optical elements of an optical system against undesirable mechanical wave energy induced spatial dislocation the steps of:
    mounting an optical element of the optical system to the rotor of a gyroscope having electrical actuator coils for controllably moving the rotor with respect to inertial space and electrical transducer coils for sensing the orientation of the rotor with respect to inertial space in such a way that the normal to the optical element is colinear with the axis of rotation of the rotor; and
    controllably electrically energized the actuator coils of the rotor to selectively orient the optical element mounted thereto with respect to inertial space.

13. The invention of claim 12, further including the step of rotating the rotor about the axis of rotation defining a gyroscopic axis of stability colinear with the normal to the optical element for vibrationally isolating the optical element fastened thereto against mechanical wave energy induced spatial locations by action of the phenomenon of gyroscopic inertia that tends to maintain the normal to the optical element colinear with the axis of rotation of the rotor and colinear with the gyroscopic axis of stability and unaltered with respect to inertial space notwithstanding said mechanical wave energy.

14. The invention of claim 13, further including the step of sensing the degree of electrical energization in the transducer coils to detect the orientation of the optical element with respect to inertial space.

15. Apparatus for vibrationally isolating an optical system against mechanical wave energy comprising:
    a mirror forming part of the optical system that is statically and dynamically balanced about an axis of rotation and that is subject to spatial dislocation by said mechanical wave energy; and
    means coupled to said mirror for spinning said mirror about said axis defining a gyroscopic axis of stability for providing vibration isolation by action of the phenomena of gyroscopic stability that tends to maintain the gyroscopic axis of stability fixed with respect to inertial space notwithstanding said mechanical wave energy.

16. The invention of claim 15, wherein said spinning means includes a gyroscope having a rotor and coils, and wherein said mirror is mounted to said rotor for rotation therewith.

17. The invention of claim 16, further including means for actuating the coils of said gyroscope for providing tilt control of said mirror mounted to said rotor.

18. The invention of claim 15, wherein said mirror is a cavity feedback mirror of a laser resonant cavity.

19. The invention of claim 18, wherein said resonant cavity is a confocal unstable resonant cavity.

20. The invention of claim 19, further including a 45° scraper mirror mounted adjacent said cavity feedback mirror, and means for selectively tilting said scraper mirror.

21. The invention of claim 15, wherein said mirror is an optical relay mirror.

22. In a method for vibrationally isolating the optical elements of an optical system against undesirable mechanical wave energy induced spatial dislocation the steps of:
    directing optical radiation onto the surface of an optical element mounted to the rotor of a gyroscope having electrical actuator coils for orienting the rotor with respect to inertial space and electrical transducer coils for sensing the orientation of the rotor with respect to inertial space in such a way that the normal to the optical element is colinear with the axis of rotation of the rotor; and
    controllably electrically energizing the actuator coils to selectively orient the optical element with respect to inertial space.

23. The invention of claim 22, further including the step of rotating the rotor about the axis of rotation defining a gyroscopic axis of stability colinear with the normal to the optical element for gyroscopically stabilizing the optical element fastened thereto against mechanical wave energy induced spatial dislocation by action of the phenomenon of gyroscopic inertia that tends to maintain the normal to the optical element coincident with the gyroscopic axis of stability and unaltered with respect to inertial space notwithstanding said mechanical wave energy.

24. The invention of claim 22, further including the step of sensing the electrical energization in the transducer coils to detect the orientation of the optical element with respect to inertial space.

* * * * *